(12) United States Patent
Swinderman

(10) Patent No.: US 9,409,713 B2
(45) Date of Patent: Aug. 9, 2016

(54) BULK MATERIAL CONVEYOR BELT LOADING ZONE AND METHOD OF LOADING A BULK MATERIAL CONVEYOR BELT

(71) Applicant: Martin Engineering Company, Neponset, IL (US)

(72) Inventor: Robert Todd Swinderman, Palm Coast, FL (US)

(73) Assignee: Martin Engineering Company, Neponset, IL (US)

(*) Notice: Subject to any disclaimer, the term of this patent is extended or adjusted under 35 U.S.C. 154(b) by 0 days.

(21) Appl. No.: 14/521,036

(22) Filed: Oct. 22, 2014

(65) Prior Publication Data

US 2016/0114978 A1    Apr. 28, 2016

(51) Int. Cl.
| B65G 47/04 | (2006.01) |
|---|---|
| B65G 15/08 | (2006.01) |
| B65G 37/00 | (2006.01) |
| B65G 15/60 | (2006.01) |

(52) U.S. Cl.
CPC ............. *B65G 15/08* (2013.01); *B65G 15/60* (2013.01); *B65G 37/00* (2013.01)

(58) Field of Classification Search
CPC ...... B65G 15/08; B65G 15/60; B65G 39/125; B65G 21/2081
USPC .............................. 198/562, 826, 818, 836.1
See application file for complete search history.

(56) References Cited

U.S. PATENT DOCUMENTS

| 2,427,590 | A | * | 9/1947 | Conners | ............... | B65G 39/125 |
|---|---|---|---|---|---|---|
| | | | | | | 198/826 |
| 2,665,795 | A | * | 1/1954 | Holwick | ............ | B65G 21/2081 |
| | | | | | | 198/830 |
| 2,685,955 | A | | 8/1954 | Kinney et al. | | |
| 2,818,966 | A | * | 1/1958 | Gill | ....................... | B65G 39/125 |
| | | | | | | 198/826 |
| 2,883,035 | A | * | 4/1959 | Erisman | ............. | B65G 21/2081 |
| | | | | | | 198/502.1 |
| 2,998,121 | A | | 8/1961 | Gilbert | | |
| 3,628,648 | A | | 12/1971 | McClusky | | |
| 4,245,738 | A | * | 1/1981 | Butcher | ................. | B65G 21/14 |
| | | | | | | 198/812 |
| 4,775,047 | A | | 10/1988 | Grall | | |
| 5,303,813 | A | * | 4/1994 | de Rooy | ............. | B65G 21/2081 |
| | | | | | | 198/525 |
| 5,350,053 | A | | 9/1994 | Archer | | |

(Continued)

FOREIGN PATENT DOCUMENTS

GB          2234482 A       2/1991

*Primary Examiner* — William R Harp
(74) *Attorney, Agent, or Firm* — Thompson Coburn LLP; Clyde L. Smith

(57) ABSTRACT

A conveyor belt assembly comprises a conveyor belt, a tail pulley, and a transition zone comprising a loading device. The conveyor is looped around the tail pulley and has a generally flat transverse cross-section on the tail pulley. The conveyor belt transitions from having the generally flat cross-section to having a full-trough cross section in the transition zone. The loading device comprises a chute and skirtboards that are connected to each other and that are above the conveyor belt. The loading device is configured to load bulk material onto the belt in the transition region. The skirtboards have linear bottom surfaces that rise as the distance from the tail pulley increases. The conveyor belt is supported from below in the transition zone in a manner creating linear portions of the conveyor belt directly beneath the skirtboards that also rise as the distance from the tail pulley increases.

4 Claims, 4 Drawing Sheets

(56) References Cited

U.S. PATENT DOCUMENTS 6,155,407 A * 12/2000 Shelstad ................ B65G 39/12
198/525

6,269,943 B1  8/2001  Mott
6,293,389 B1  9/2001  Knapp et al.
7,467,707 B1 * 12/2008  Gabhart ................ B65G 15/62
198/818

* cited by examiner

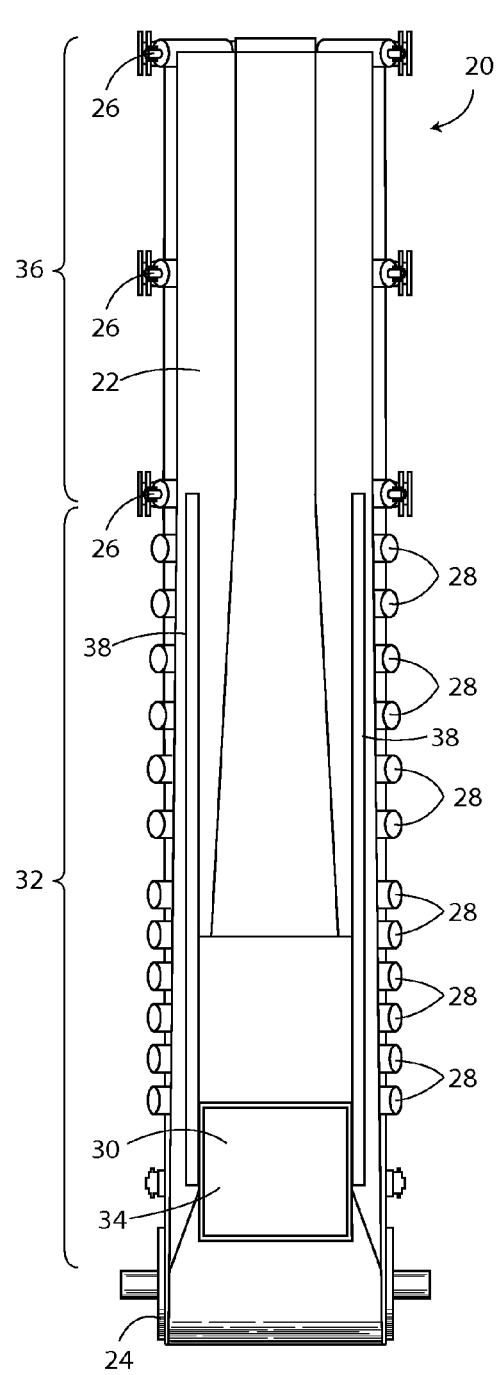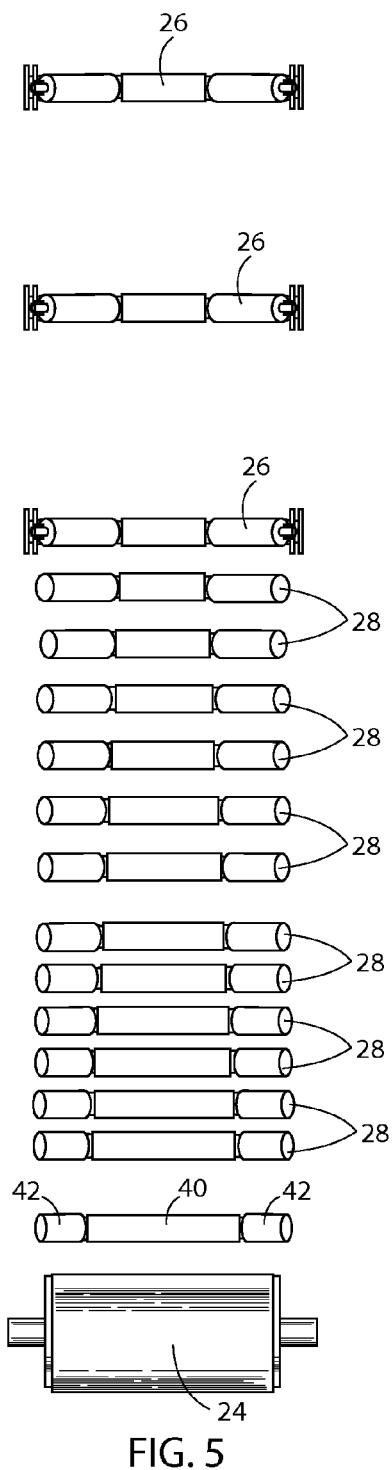
FIG. 4
FIG. 5

BULK MATERIAL CONVEYOR BELT LOADING ZONE AND METHOD OF LOADING A BULK MATERIAL CONVEYOR BELT

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention pertains to loading bulk material, such as ore, onto troughed belt conveyors. More particularly, the present invention pertains to loading bulk material onto such belt conveyors close to the tail end of the conveyor belt in the region/zone where the belt transitions from flat to troughed.

2. General Background

Bulk material belt conveyors are widely used to move bulk material, including material such as ore, grain, and bulk solid chemicals. Such bulk material belt conveyors each comprise an endless conveyor belt that extends between a tail pulley and a head pulley. Idlers are typically provided in a spaced apart manner between the tail and head pulleys and beneath the upper run of the belt for supporting the weight of the belt and the material thereon. It is common for idlers to include a horizontal center roller(s) or slider bar(s) and opposite tilted wing roller(s) or slider bar(s) to provide the conveyor belt with a trough shaped transverse cross-section. Often, the wing rollers or bars are oriented at thirty-five degrees from horizontal. By providing the conveyor belt with a trough shaped cross-section, more bulk material can be loaded onto the belt without spillage. As should be appreciated, the tail and head pulleys must be cylindrical or nearly cylindrical since the conveyor belt must loop around such pulleys. Thus, the cross-sections of such conveyor belts transition from being generally trough shaped to being generally flat near the pulleys. The transition distance is almost universally calculated based on DIN 22101 (Deutsches Institut Fur Normung E.V., German National Standard), which limits the edge stress of the belt as it goes from flat to troughed. This transition length is customarily limited to no more than 8.5 for fabric and 11.0 for steel cable belts times the vertical rise. The best practice for bulk material conveyor belts is to load a conveyor with material near the tail pulley but where the belt is fully troughed downstream of the transition zone since the cross-section of the belt throughout the transition zone is non-uniform.

In particular situations, such as when space is limited or cost is an issue, it is common (but poor) practice to load a belt conveyor on the transition as close to the tail pulley as possible. However, the edge portions of conveyor belts are generally helical shaped in the transition zone, which makes it difficult to seal a loading chute against the belt in the transition zone and almost always results in skirtboard, wearliner and skirt seal wear, and belt damage. Another way to load a conveyor belt closer to the tail pulley is to lower the angle of the wing roller(s) or bars to thereby decrease the belt edge vertical rise and reduce the acceptable transition distance according to the DIN 22101 design method. However, a lower trough angle has a lower carrying capacity. Yet another technique is to partially trough the belt by raising the terminal pulley above the level of the center roller in an idler set. However, doing that can cause belt buckling and/or cause belts to rise off of idlers.

SUMMARY OF THE INVENTION

The present invention is directed to loading bulk material conveyor belts in the transition zone. The invention controls the cross-sectional shape of a conveyor belt in the transition zone in a manner allowing for linear skirtboards and linear seals to effectively seal against the belt in the transition zone.

In one aspect of the invention, a bulk material conveyor belt assembly comprises a looped conveyor belt, a tail pulley, a downstream full-trough region, and a transition zone comprising a loading device. The looped endless conveyor belt extends around a closed path. The conveyor belt is also looped around the tail pulley and has a generally flat cross-section on the tail pulley transverse to the closed path. The conveyor belt is supported from below in the full-trough region in a manner such that the conveyor belt has a concave cross-section transverse to the closed path, from above, in the full-trough region. The conveyor belt transitions from having the generally flat cross-section to the concave cross-section in the transition zone. The loading device comprises a chute and skirtboards that are connected to each other and that are above the conveyor belt. The loading device is configured and adapted to load bulk material onto the belt in the transition region. The skirtboards of the loading device have linear bottom surfaces that rise as the distance from the tail pulley increases. The conveyor belt is supported from below in the transition zone in a manner creating linear portions of the conveyor belt directly beneath the skirtboards of the loading device that also rise as the distance from the tail pulley increases.

Another aspect of the invention pertains to inducing another to construct or alter a bulk material conveyor belt assembly in a manner such that the constructed or altered conveyor belt assembly comprises a looped conveyor belt, a tail pulley, a downstream full-trough region, and a transition zone comprising a loading device. The looped endless conveyor belt extends around a closed path. The conveyor belt is also looped around the tail pulley and has a generally flat cross-section on the tail pulley transverse to the closed path. The conveyor belt is supported from below in the full-trough region in a manner such that the conveyor belt has a concave cross-section transverse to the closed path, from above, in the full trough region. The conveyor belt transitions from having the generally flat cross-section to the concave cross-section in the transition zone. The loading device comprises a chute and skirtboards that are connected to each other and that are above the conveyor belt. The loading device is configured and adapted to load bulk material onto the belt in the transition region. The skirtboards of the loading device have linear bottom surfaces that rise as the distance from the tail pulley increases. The conveyor belt is supported from below in the transition zone in a manner creating linear portions of the conveyor belt directly beneath the skirtboards of the loading device that also rise as the distance from the tail pulley increases.

The term "horizontal" as used in the claims and specification of this application means generally parallel to the direction that the belt moves and parallel to the widthwise direction of the conveyor belt. Thus, horizontal should not be construed as being limited to being perpendicular to gravity.

Further features and advantages of the present invention, as well as the operation of the invention, are described in detail below with reference to the accompanying drawings.

BRIEF DESCRIPTION OF THE SEVERAL VIEWS OF THE DRAWING

FIG. 4 is a top plan view of the bulk material conveyor belt assembly shown in FIGS. 1-3.

FIG. 5 is the top plan view of the idlers and tail pulley of the bulk material conveyor belt assembly shown in FIGS. 1-4.

Figure 1:
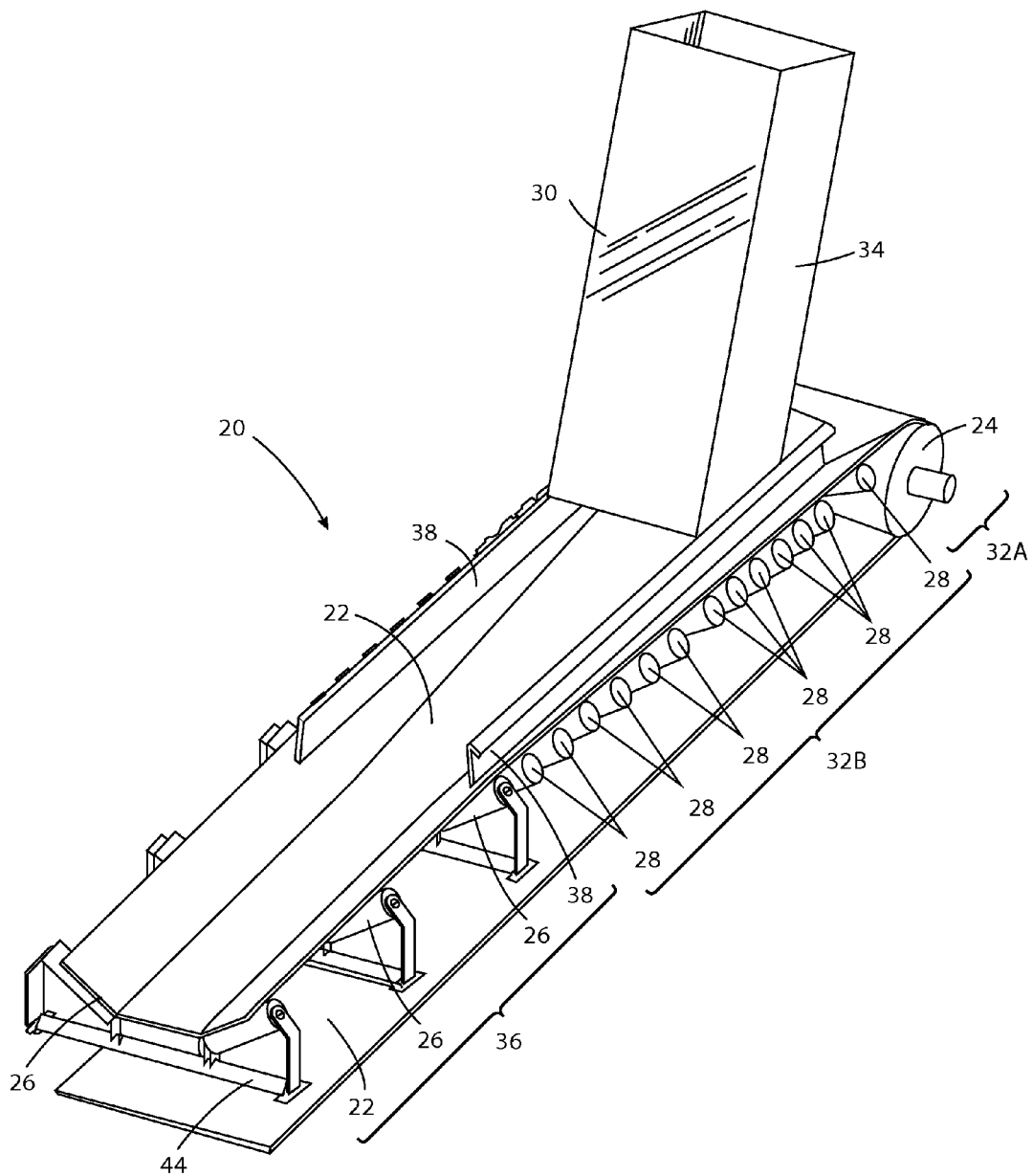
FIG. 1 depicts a perspective view of a bulk material conveyor belt assembly in accordance with the assembly.
Figure 2:
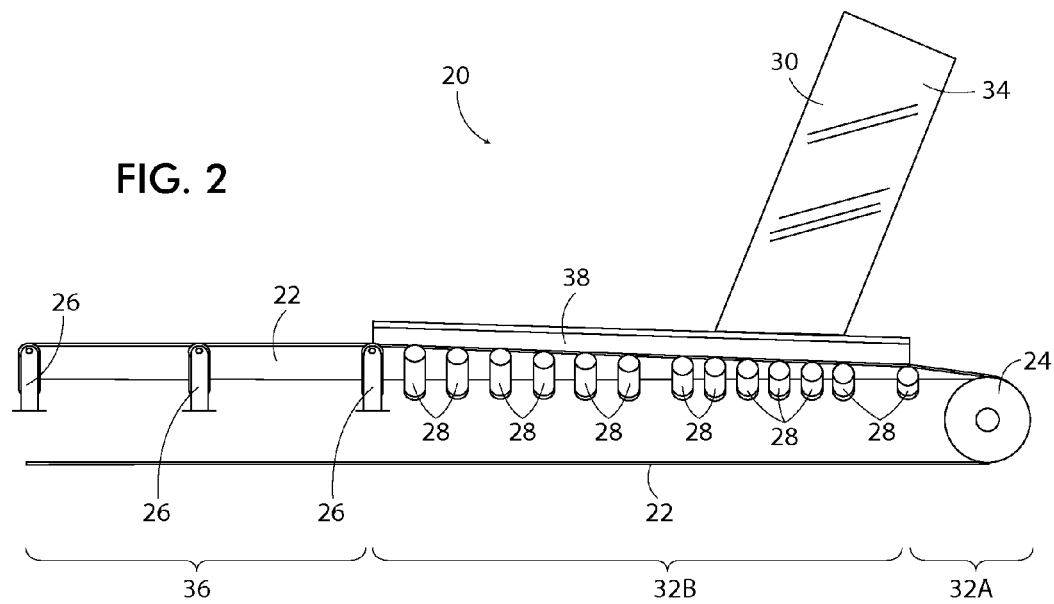
FIG. 2 depicts a side elevation view of the bulk material conveyor belt assembly shown in FIG. 1.

Reference numerals in the written specification and in the drawing figures indicate corresponding items.

DETAILED DESCRIPTION

An embodiment of a portion of bulk material belt conveyor assembly (20) in accordance with the invention is shown in the figures. The conveyor assembly (20) comprises an endless conveyor belt (22), a tail pulley (24), standard idlers (26), transition idlers (28), and a loading device (30). The conveyor belt (22) shown is a 48-inch wide belt with a first transition zone (32A), and a second transition zone (32B) is approximately 12.5 feet long. The transition idlers (28) beneath the loading chute (34) of the loading device (30) are spaced approximately 9 inches apart from each other on center, whereas the transition idlers downstream thereof are spaced approximately 12 inches apart. The standard idlers (26) in the full-trough region (36) of the conveyor assembly (20) are preferably spaced 48 inches apart.

As mentioned above, the loading device (30) comprises the loading chute (34) and further comprises skirtboards (38). The skirtboards (38) are parallel to each other and have linear bottom edges or surfaces that slope upward as the skirtboards extend downstream away from the tail pulley (24). Skirt seals may be provided on the base of skirtboards (38) for contacting the conveyor belt (22) to minimize the escape of fugitive bulk material.

Each of the transition idlers (28) comprises a horizontal center roller (40) and two sloped wing rollers (42) on opposite sides of the center roller that are all supported by a structural frame (not shown for clarity, but similar to the structural frame (44) of the standard idlers (26), as best shown in FIG. 1). In combination with or in lieu of rollers, slider bars may be used. With each successive transition idler (28), the axial lengths of the center rollers (40) decrease while the axial lengths of the wing rollers (42) increase as the distance from the tail pulley (24) increases. Additionally, the angles of the wing rollers (42) of the transition idlers (28) also gradually increase as the distance from the tail pulley (24) increases. The center roller (40) lengths are preferably linearly transitioned from the upstream most standard idler (26). The angles and lengths of the wing rollers (42) in the second transition zone (32B) are calculated to provide an essentially linear surface at the intersection of the skirtboard edges (38) and the belt (22) immediately below the skirtboard edges providing an interface gap between each skirtboard and the belt that is essentially uniform and adaptable to a wearliner skirtboard sealing systems that mitigate uneven wear and belt damage. The various angles and lengths are demonstrated in the table below (all lengths being in inches and all angles being degrees).

| idler | center roller axial length | wing roller axial length | trough angle |
|---|---|---|---|
| Transition 1 | 32.79 | 9.50 | 20.00 |
| Transition 2 | 32.09 | 9.93 | 21.70 |
| Transition 3 | 31.17 | 10.37 | 23.22 |
| Transition 4 | 30.25 | 10.81 | 24.58 |
| Transition 5 | 29.34 | 11.26 | 25.82 |
| Transition 6 | 28.42 | 11.71 | 26.95 |
| Transition 7 | 27.50 | 12.16 | 27.97 |
| Transition 8 | 26.57 | 12.61 | 28.91 |
| Transition 9 | 25.04 | 13.37 | 30.30 |
| Transition 10 | 23.80 | 13.99 | 31.29 |
| Transition 11 | 22.57 | 14.60 | 32.18 |
| Transition 12 | 21.34 | 15.22 | 32.98 |
| Transition 13 | 20.10 | 15.84 | 32.72 |
| Transition 14 | 18.87 | 16.46 | 34.39 |
| standard | 17.63 | 17.63 | 35.00 |

Figure 3:
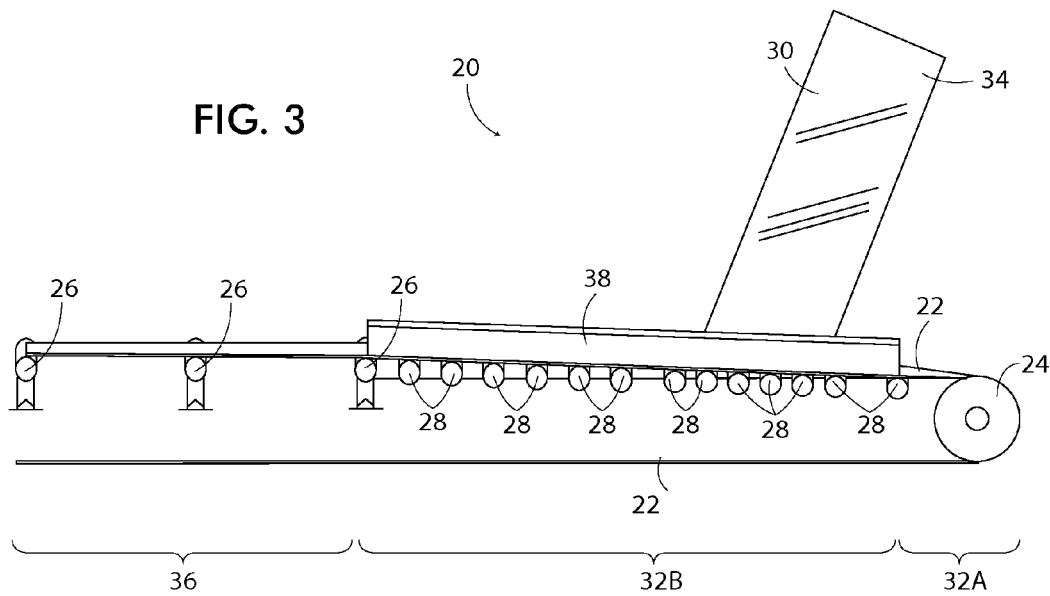
FIG. 3 depict a cross-sectional elevation view of the bulk material conveyor belt assembly shown in FIGS. 1 and 2 taken about the plane of one of the skirtboards of the assembly.
Figure 6:
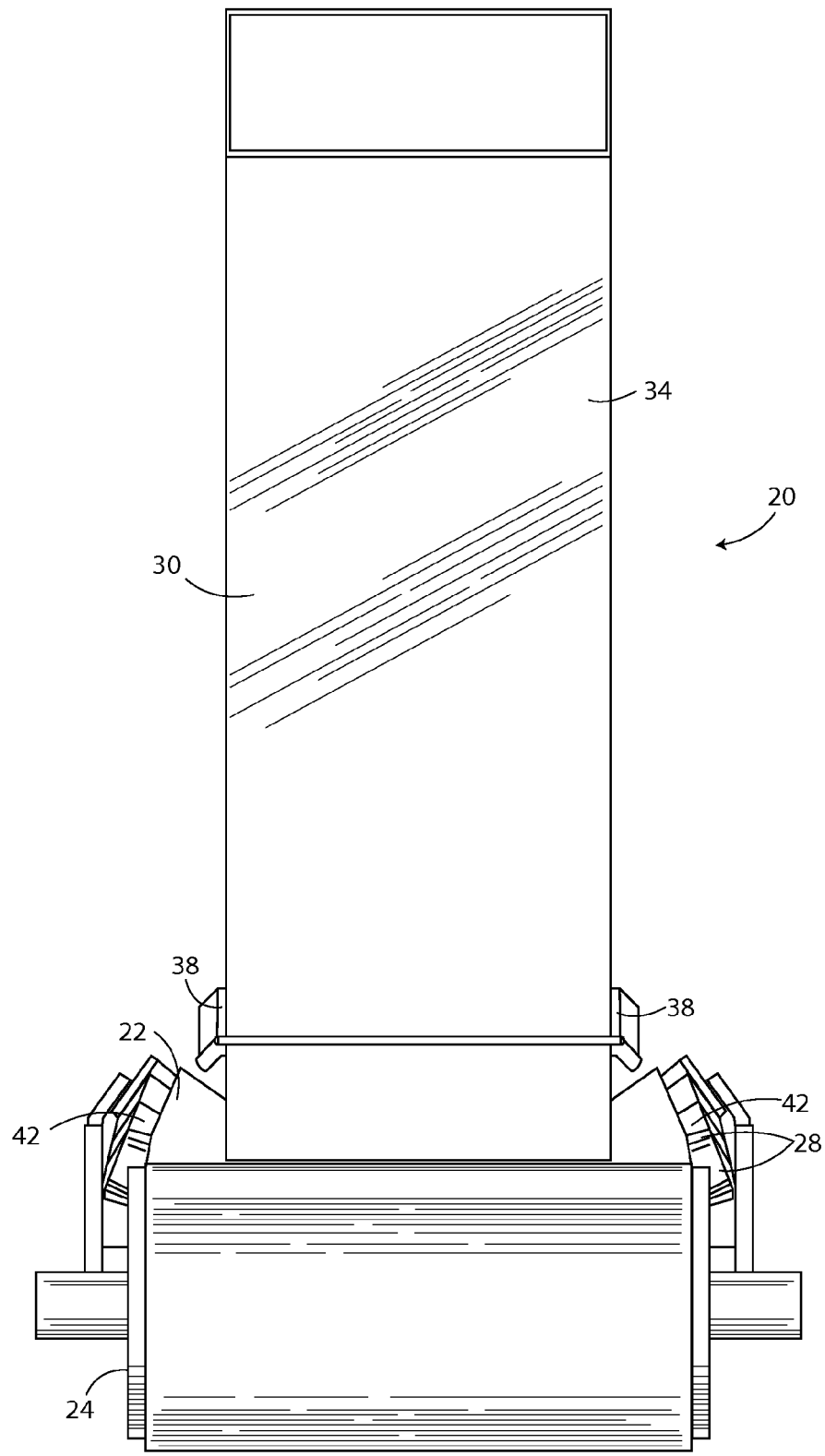
FIG. 6 is a rear (tail) elevation view of the bulk material conveyor belt assembly shown in FIGS. 1-4.

Configured as described above, the upstream most transition idler (28) transitions the belt (22) from flat at the tail pulley (24) to 20 degrees in the first transition zone (32A). As such, the wing portions of the belt 22 in the first transition zone 32A have a helical shape. The length of the center roller (40) of the upstream most transition idler (28) is approximately the width of chute (34) with its wing rollers (42) set at 20 degrees. The second transition zone (32B) consist of transition idlers (28) that support the conveyor belt (22) in the region and transitions the belt from a 20 degree shallow trough to full-trough (35 degrees). Moreover, the transition idlers (28) do this in a manner such that the sloped sides of the conveyor belt (22) are close to being planer throughout the second transition zone (32B). More importantly, the width between wing rollers (42) of each transition idler (28) and the distance between the transition idlers (28) themselves are set such that a line of tangency exists along the leftmost wing rollers and such that a line of tangency exists along the rightmost wing rollers. Preferably, such lines of tangency extend parallel to the belt path and are positioned directly beneath the skirtboards (38) of the loading device (30) so that the conveyor belt (22) directly beneath the skirtboards is generally linear. As shown most clearly in FIG. 3, it should be appreciated that the linear portion(s) of the conveyor belt (22) beneath the skirtboards (38) slope upward as they extend away from the tail pulley (24). It should also be appreciated that the conveyor belt naturally sags slightly between the idlers (28) and therefore is not truly linear. However, the term "linear" as used throughout this application should be interpreted to encompass slight sagging of the belt between rollers.

In view of the foregoing configuration of the conveyor belt assembly (20), the skirt boards (38) of the loading device (30) closely match the contour of the portions of the conveyor belt (22) directly beneath the skirtboards and linear skirt seals can extend down from the skirtboards and against the conveyor belt to effectively seal the small linear gaps between the skirt boards and conveyor belt. Thus, bulk material can be loaded onto the conveyor belt (22) in the transition zone (32) via the loading chute (34) without appreciable spillage. As such, the invention permits users to greatly reduce the minimal distance between the tail pulley (24) and where the conveyor belt

(22) is loaded without the previous disadvantages. It should also be appreciated that a similar transition could be provided at the head (discharge) end of a conveyor belt assembly such that linear skirtboards could be used always all the way to the head pulley.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent or explicit.

What is claimed is:

1. A bulk material conveyor belt assembly comprising:
a looped endless conveyor belt that extends around a closed path, the conveyor belt having opposite edge portions;
a tail pulley, the conveyor belt being looped around the tail pulley, the conveyor belt having a generally flat cross-section on the tail pulley transverse to the closed path;
a downstream full-trough region, the conveyor belt being supported from below in the full-trough region by a plurality of idlers in a manner such that an upper surface of the conveyor belt has a concave cross-section transverse to the closed path in the full trough region;
a transition zone comprising a loading device, the conveyor belt transitioning from having the generally flat cross-section to the concave cross-section in the transition zone, the loading device comprising a chute and skirtboards that are connected to each other and that are above the conveyor belt, the loading device being configured and adapted to load bulk material onto the belt in the transition region, the skirtboards of the loading device having linear bottom surfaces that rise as the distance from the tail pulley increases, the conveyor belt being supported from below by the plurality of idlers in the transition zone in a manner creating linear portions of the conveyor belt directly beneath the skirtboards of the loading device that also rise as the distance from the tail pulley increases, each of the idlers comprising at least two wing rollers or slider bars that are in contact with the underside of the conveyor belt beneath the linear portions of the conveyor belt and that are inclined from horizontal and from each other, the at least two wing rollers or slider bars of each successive idler being inclined more from horizontal than are the wing rollers or slider bars of any of the idlers between the successive idler and the tail pulley, each of the idlers also comprising a horizontal roller or slider bar that is in contact with the underside of the conveyor belt and that has an axial length, the axial length of the horizontal roller or slider bar of each successive idler being less than that of the horizontal rollers or slider bars of any of the idlers between the successive idler and the tail pulley.

2. A bulk material conveyor belt assembly in accordance with claim 1 wherein the skirtboards are parallel to each other and to the closed path.

3. A bulk material conveyor belt assembly in accordance with claim 1 wherein the at least two wing rollers or slider bars of each successive idler are spaced closer to each other than are the wing rollers or slider bars of any of the idlers between the successive idler and the tail pulley.

4. A bulk material conveyor belt assembly comprising:
a looped endless conveyor belt that extends around a closed path, the conveyor belt having opposite edge portions;
a tail pulley, the conveyor belt being looped around the tail pulley, the conveyor belt having a generally flat cross-section on the tail pulley transverse to the closed path;
a downstream full-trough region, the conveyor belt being supported from below in the full-trough region by a plurality of idlers in a manner such that an upper surface of the conveyor belt has a concave cross-section transverse to the closed path in the full trough region;
a transition zone comprising a loading device, the conveyor belt transitioning from having the generally flat cross-section to the concave cross-section in the transition zone, the loading device comprising a chute and skirtboards that are connected to each other and that are above the conveyor belt, the loading device being configured and adapted to load bulk material onto the belt in the transition region, the skirtboards of the loading device having linear bottom surfaces that rise as the distance from the tail pulley increases, the conveyor belt being supported from below by the plurality of idlers in the transition zone in a manner creating linear portions of the conveyor belt directly beneath the skirtboards of the loading device that also rise as the distance from the tail pulley increases, each of the idlers comprising a horizontal roller or slider bar that is in contact with the underside of the conveyor belt and that has an axial length, the axial length of the horizontal roller or slider bar of each successive idler being less than that of the horizontal rollers or slider bars of any of the idlers between the successive idler and the tail pulley.

* * * * *